(12) United States Patent
Krishnan et al.

(10) Patent No.: US 8,719,449 B2
(45) Date of Patent: May 6, 2014

(54) IDENTIFICATION OF A PRIVATE DEVICE IN A PUBLIC NETWORK

(75) Inventors: Suresh Krishnan, Montreal (CA); Alan Kavanagh, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 596 days.

(21) Appl. No.: 12/955,540

(22) Filed: Nov. 29, 2010

(65) Prior Publication Data

US 2012/0136976 A1 May 31, 2012

(51) Int. Cl.
*G06F 15/16* (2006.01)
(52) U.S. Cl.
USPC .......................................... 709/245; 709/223
(58) Field of Classification Search
USPC .................. 709/202, 203, 219, 227, 245, 223
See application file for complete search history.

(56) References Cited

U.S. PATENT DOCUMENTS

| | | | | |
|---|---|---|---|---|
| 6,101,189 A * | 8/2000 | Tsuruoka | | 370/401 |
| 6,118,784 A * | 9/2000 | Tsuchiya et al. | | 370/401 |
| 6,128,644 A * | 10/2000 | Nozaki | | 709/203 |
| 6,400,729 B1 * | 6/2002 | Shimadoi et al. | | 370/466 |
| 6,690,669 B1 * | 2/2004 | Tsuchiya et al. | | 370/392 |
| 6,691,227 B1 | 2/2004 | Neves et al. | | |
| 6,708,219 B1 * | 3/2004 | Borella et al. | | 709/245 |
| 6,731,642 B1 * | 5/2004 | Borella et al. | | 370/401 |
| 6,816,912 B1 * | 11/2004 | Borella et al. | | 709/238 |
| 6,822,957 B1 * | 11/2004 | Schuster et al. | | 370/389 |
| 6,862,274 B1 * | 3/2005 | Tsao et al. | | 370/338 |
| 7,042,876 B1 * | 5/2006 | Jayasenan et al. | | 370/389 |
| 7,149,225 B2 * | 12/2006 | Thubert et al. | | 370/401 |
| 8,165,091 B2 * | 4/2012 | Nix | | 370/331 |
| 8,493,937 B2 * | 7/2013 | Nix | | 370/331 |
| 8,509,185 B2 * | 8/2013 | Haddad | | 370/331 |
| 8,509,244 B2 * | 8/2013 | Haddad | | 370/395.53 |
| 2001/0002198 A1 * | 5/2001 | Lindgren et al. | | 370/466 |
| 2001/0032270 A1 * | 10/2001 | Koo | | 709/237 |
| 2001/0049825 A1 * | 12/2001 | Hirose et al. | | 725/111 |
| 2002/0024959 A1 | 2/2002 | Kong | | |
| 2002/0026475 A1 * | 2/2002 | Marmor | | 709/203 |
| 2002/0138622 A1 * | 9/2002 | Dorenbosch et al. | | 709/227 |
| 2002/0169887 A1 * | 11/2002 | MeLampy et al. | | 709/231 |

(Continued)

FOREIGN PATENT DOCUMENTS

WO 00/69155 A2 11/2000
WO WO 2010/004180 A1 1/2010

OTHER PUBLICATIONS

International Search Report from corresponding application PCT/IB2011/055290.

*Primary Examiner* — Sargon Nano
(74) *Attorney, Agent, or Firm* — Alex Nicolaescu; Ericsson Canada Inc.

(57) ABSTRACT

Methods, network address translation (NAT) devices, network nodes and system for allowing identification of a private device in a public network or treating traffic of a private device in a public network. The NAT may allocate a private IPv4 address to the private device, reserve a block of ports on the public IPv4 address for the private device and send an identification of the block of ports to a network node in the public network. The network node of the public network may receive an identification of a block of ports on the public IPv4 address indicating that the block of ports is reserved for the private device and activate a rule for treating traffic of the private device.

16 Claims, 7 Drawing Sheets

(56) References Cited

U.S. PATENT DOCUMENTS

| | | | |
|---|---|---|---|
| 2003/0048804 A1* | 3/2003 | Inouchi et al. | 370/466 |
| 2003/0050051 A1* | 3/2003 | Vilander | 455/414 |
| 2003/0225912 A1* | 12/2003 | Takeda et al. | 709/246 |
| 2004/0179508 A1* | 9/2004 | Thubert et al. | 370/349 |
| 2004/0190549 A1* | 9/2004 | Huitema | 370/466 |
| 2006/0272009 A1 | 11/2006 | Stott | |
| 2007/0171930 A1* | 7/2007 | Kamata et al. | 370/432 |
| 2009/0216895 A1* | 8/2009 | Witchey | 709/230 |
| 2011/0110375 A1 | 5/2011 | Boucadair et al. | |
| 2012/0281673 A1* | 11/2012 | Nix | 370/331 |
| 2013/0294348 A1* | 11/2013 | Haddad | 370/328 |
| 2013/0301651 A1* | 11/2013 | Haddad | 370/467 |

* cited by examiner

IDENTIFICATION OF A PRIVATE DEVICE IN A PUBLIC NETWORK

TECHNICAL FIELD

The present invention relates to IPv4 addressing and, more precisely, to IPv4 addressing limitation from behind a network address translation device.

BACKGROUND

Internet Protocol (IP) version 4 (IPv4) uses 32-bit (four-byte) addresses, which limits the address space to 4,294,967,296 ($2^{32}$) possible unique IPv4 addresses. Some IPv4 addresses are reserved for special purposes such as private networks (~18 million IPv4 addresses) or multicast IPv4 addresses (~270 million IPv4 addresses). The number of public IPv4 addresses that can potentially be allocated for routing on the public Internet is thereby reduced. Furthermore, public IPv4 addresses have been and continue to be assigned to different organizations. Public IPv4 address exhaustion is a known issue expected to be addressed, in the long term, by deployment of IP version 6 (IPv6). However, there is very little pressure to change largely deployed and properly working systems from IPv4 to IPv6 in short to mid term, especially from providers that benefit from a relatively large pool of already assigned public IPv4 addresses. Solutions such as, for instance, network address translation (NAT) together with private IPv4 addresses are seen as sufficient by many providers. Private IPv4 addresses are not routable outside of private networks and private machines, since they cannot communicate over public networks, have to pass through a NAT device therefor.

Most fixed broadband Service Providers (SP) provide a single public IPv4 address that is assigned to a Residential Gateway (RG) acting as a NAT device for a particular subscriber. Typically, the subscriber in turn connects multiple IPv4 devices behind the Residential Gateway (RG). These devices are assigned a private IPv4 address allocated by the RG in the home network and all these devices, using NAT, share the same single public IPv4 address that was assigned to the RG from the SP.

Some fixed and mobile SP move towards fixed-mobile convergence or interworking network business models and become fixed-mobile SP or otherwise partner to present a fixed-mobile SP to their subscriber. In those exemplary business models, devices should be able to use any network access type to obtain services from their fixed-mobile SP. A more specific example involves a 3rd Generation Partnership Project (3GPP) User Equipment (UE) mobile device connecting over Wireless Local Area Network (WLAN or WiFi) to a RG provided by a fixed-mobile SP to obtain their mobile services.

Unfortunately, the current addressing scheme based on NAT and private IPv4 addresses does not provide proper device identification in the SP network for services to be provided adequately. The present invention aims at providing at least a partial solution to the aforementioned issues.

SUMMARY

A first aspect of the present invention is directed to a method for allowing identification of a private device in a public network. The method comprises a step of, in a network address translation device, allocating a private IPv4 address to the private device. The network address translation device has a public IPv4 address valid in the public network and the private device is not in the public network. the method also comprise, in the network address translation device, steps of reserving a block of ports on the public IPv4 address for the private device and sending an identification of the block of ports to a network node in the public network.

Optionally, the method may further comprise, in the network address translation device, the steps of receiving a connection request towards the public network from the private device and forwarding the connection request on the public network using at least one port from the block of ports reserved for the private device.

The step of sending the identification of the block of ports may optionally further comprise sending an identification of the private device to the network node in the public network. The public network may also be an IPv6 network and the public IPv4 address may be represented in IPv6 address to ensure backward compatibility. The block of ports may be a non-contiguous or contiguous group of at least two ports.

A second aspect of the present invention is directed to a method for treating traffic of a private device in a public network, wherein the private device is located behind a network address translation device having a public IPv4 address. The method comprises, in a network node of the public network, the steps of receiving an identification of a block of ports on the public IPv4 address indicating that the block of ports is reserved for the private device and activating a rule for treating traffic of the private device.

Optionally, the method may further comprise, in the network node of the public network, the steps of receiving traffic addressed from the public IPv4 address on at least one port from the block of ports reserved for the private device, identifying the received traffic as traffic of the private device, applying the rule to the traffic of the private device and, forwarding the traffic in the public network towards its destination.

The step of activating a rule for treating traffic of the private device may further optionally comprise receiving the rule from another network node of the public network before activating the rule upon reception of the identification of the block of ports or creating and activating the rule upon reception of the identification of the block of ports.

The step of receiving the identification of a block of ports on the public IPv4 address may also further optionally comprise receiving an identification of the private device from the network address translation device and the method may then further comprise the step of before activating the rule, intercepting in the network node of the public network the identification of the private device during authentication thereof with an authentication function or before activating the rule, receiving in the network node of the public network the identification of the private from the authentication function following authentication of the private device therewith.

A third aspect of the present invention is directed to a network node in a communications network comprising an address management module and a network address translation module. The address management module that is assigned a public IPv4 address valid in a public network and allocates a private IPv4 address to a private device not in the public network. The network address translation module reserves a block of ports on the public IPv4 address for the private device and sends an identification of the block of ports to a further network node in the public network.

Optionally, the network address translation module may further receive a connection request towards the public network from the private device and forward the connection request on the public network using at least one port from the block of ports reserved for the private device. The network address translation module may also send the identification of the block of ports together with an identification of the private device to the further network node in the public network.

A fourth aspect of the present invention is directed to a network node in a public network in communication with a network address translation device having a public IPv4 address. A private device is located behind the network address translation device, not in the public network. The network node comprises a traffic treatment module that receives an identification of a block of ports on the public IPv4 address indicating that the block of ports is reserved for the private device and activates a rule for treating traffic of the private device.

Optionally, the traffic treatment module may further receive traffic addressed from the public IPv4 address on at least one port from the block of ports reserved for the private device, identify the received traffic as traffic of the private device, apply the rule to the traffic of the private device and forward the traffic in the public network towards its destination.

The traffic treatment module may further optionally activate a rule for treating traffic of the private device by receiving the rule from another network node of the public network before activating the rule upon reception of the identification of the block of ports or create and activate the rule upon reception of the identification of the block of ports.

The traffic treatment module may also further optionally receive an identification of the private device from the network address translation device together with the identification of a block of ports on the public IPv4 address, in which case the traffic treatment module may, before activating the rule, further intercept the identification of the private device during authentication thereof with an authentication function or receive the identification of the private from the authentication function following authentication of the private device therewith.

A fifth aspect of the present invention is directed to a system for allowing identification of a private device in a public network. The system comprises a network address translation device having a public IPv4 address valid in the public network and a network node in the public network.

The network address translation device allocates a private IPv4 address to a private device, wherein the private device is not in the public network, reserves a block of ports on the public IPv4 address for the private device, sends an identification of the block of ports to a network node in the public network. The network node in the public network receives an identification of a block of ports on the public IPv4 address indicating that the block of ports is reserved for the private device and activates a rule for treating traffic of the private device.

Optionally, the network address translation device may further send an identification of the private device to the network node in the public network together with the identification of the block of ports and the network node in the public network, before activating the rule, may further intercept the identification of the private device during authentication thereof with an authentication function or receive the identification of the private from the authentication function following authentication of the private device therewith.

The network address translation device may also optionally further receive a traffic towards the public network from the private device and forward the traffic on the public network using at least one port from the block of ports reserved for the private device. The network node of the public network may then further receive the traffic addressed from the public IPv4 address on at least one port from the block of ports reserved for the private device, identify the received traffic as traffic of the private device and apply the rule to the traffic of the private device.

The identification of the block of ports on the public IPv4 address may further be registered with one public registry together with a public identifier of the private device. The system may then further comprise a correspondent node that obtains the identification of the block of ports reserved for the private device from the public registry using the public identifier of the private device and sends incoming traffic to the public IPv4 address on at least one port from the block of ports reserved for the private device. The network node of the public network may then receive the incoming traffic addressed to the public IPv4 address on the at least one port from the block of ports reserved for the private device, identify the incoming traffic as incoming traffic of the private device, apply the rule to the incoming traffic of the private device and forward the incoming traffic towards the network address translation device. The network address translation device may then further receive the incoming traffic from the public network for the private device on the at least one port from the block of ports reserved for the private device and forward the incoming traffic to the private device.

DETAILED DESCRIPTION

A user device has a private IPv4 address and is connected to a NAT device. The NAT device has a public IPv4 address assigned thereto. Embodiments of the present invention allow the user device to be identified at a node in the public side of the NAT device. This is achieved through reservation of a group of ports on the public IPv4 address at the NAT device for the user device and communication, from the NAT device to the node in the public side of the NAT device, of the reserved group of ports.

In some more specific embodiments, a residential gateway (RG) acting as a NAT device is connected, using a public IPv4 address, to an IP edge node (or border edge node or border node) in a service provider network. The IP edge node is responsible for applying, e.g., QoS, filtering and the like (e.g., policy enforcement) to specific devices connected through the RG (e.g., 3GPP UE mobile device). Upon connection of such a device with the RG, the RG allocates a private IPv4 address to the connecting device and reserves a group of ports on its public IPv4 address for the connecting device. The RG can then send identification of the reserved group of ports to the IP edge node for potential later use. When traffic for a public address is received from the device at the RG, one of the reserved ports on the public IPv4 address is used. The invention thus allows, whenever needed, proper identification of the device at the IP edge node even though it resides behind a NAT device, which in turns may allow wanted traffic treatment at the IP edge node.

Figure 1:
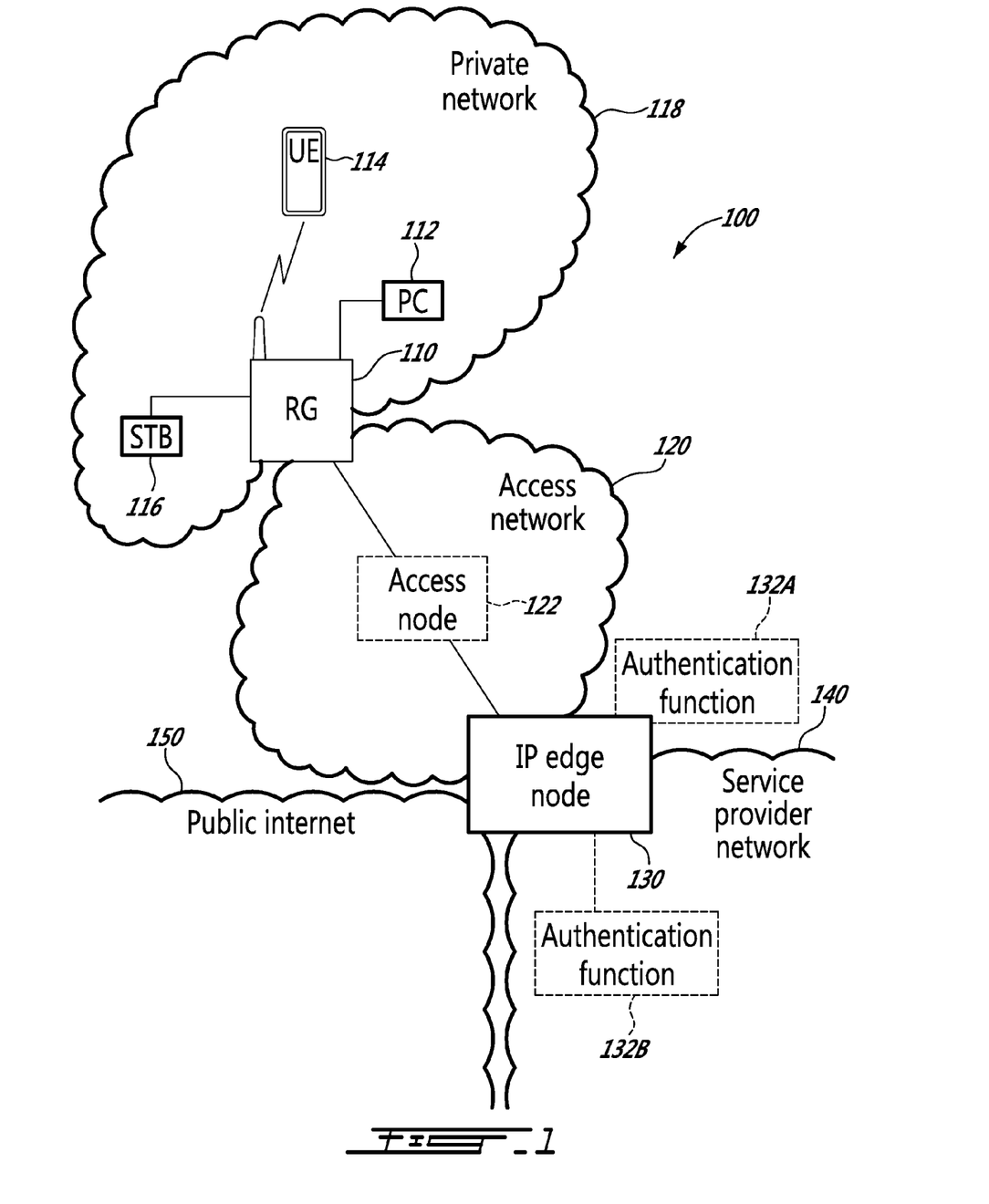
FIG. 1 is a representation of an exemplary network in accordance with the teachings of the present invention.

Reference is now to the drawings in which FIG. 1 shows a representation of an exemplary network 100 in accordance with the teachings of the present invention. The exemplary network 100 shows a Residential Gateway (RG) 110 towards which are connected one or more user devices. In the example of FIG. 1, a Personal Computer (PC) 112, a User Equipment (UE) 114 and a Set Top Box (STB) 116 are shown. Various types of network connection between the devices 112-116 and the RG 110 can exist without affecting the teachings of the present invention (e.g., WLAN or WIFI, LAN). The RG 110 defines a private (or home) network 118. Persons skilled in the art will readily recognize that the private network 118 of FIG. 1 presents an example and that many other combinations of different devices can connect to a network node such as the RG 110.

The RG 110 is connected to an access network 120 (or Wide Area Network (WAN)) towards a border node 130 represented as an IP edge node 130 on FIG. 1. The RG 110 is likely to connect towards the IP edge node 130 through an access node 122. The access node 122 functionality may also be integrated to the IP edge node 130. Of course, the access network 120 likely comprises a plurality of residential gateways (not shown) connecting many more subscribers thereto.

The IP edge node 130 connects to a service provider network 140 and to public internet 150. An authentication function can be available to the IP edge node 130. FIG. 1 shows two exemplary authentication functions that may exist simultaneously, but are likely mutually exclusive in the service provider network 140. One exemplary authentication function 132A is collocated or integrated with the IP edge node 130 while the other exemplary authentication function 132B is part of a distinct network node in the service provider network 140. When reference is made to element 132, it shall be understood that reference is made to one or the other of the authentication functions 132A and 132B. Examples of authentication function 132 include an Authentication, Authorization and Accounting (AAA) server.

Persons skilled in the art will readily recognize that the exemplary network 100 of FIG. 1 likely comprises many more network nodes and network functions (such as intermediate router, core routers, Dynamic Host Configuration Protocol (DHCP) servers, Home Subscriber Server (HSS), etc.). The present invention is not affected thereby.

For the purpose of illustrating the invention, the exemplary RG 110 of FIG. 1 is operated in a layer-3 mode or routed mode. The RG 110 obtains a public IPv4 address from the IP edge node 130 or from other another node (not shown) of the access network 120 or the service provider network 140. The RG 110 uses the obtained public IPv4 address for all communications that take place through the access network 120. The RG 110 also defines the private network 118 and is configured as the default layer-3 gateway for all devices (112-116) therein. Each device (112-116) obtains a private IPv4 address from the RG 110, which acts as a Network Address Translation (NAT) device therefor. In more detail, and as an example of NAT, when a connection request to access a public IPv4 address is received at the RG 110 from the PC 112 (i.e., in the private network 118), the RG 110 opens a port on its public IPv4 address and forwards the request therethrough in the access network 120. When a response corresponding to the request is received on the opened port, the answer is forwarded by the RG 110 to the PC 112 in the private network 118. In most circumstances, the PC 112 is not aware and does not need to be aware that the RG 110 acts as a NAT device.

As can be appreciated, in this exemplary scenario, multiple IPv4 hosts or devices (112-116) connected to the RG 110 share the RG's 110 public IPv4 address through the use of network address translation. As such, each device's (112-116) individual private IPv4 address is removed in the RG 110 in favor of its single public IPv4 address. As a result, the IP edge node 130 is unable to determine which IPv4 host is sending or receiving a request and is, consequently, unable to adapt traffic treatment to the devices (112-116) located behind the RG 110. Examples of traffic treatment include Quality of Service (QoS) service, Subscriber based Policy control and traffic scheduling on a per host basis, etc. The incapacity to identify the device behind the RG 110 becomes a bigger issue in the example of the UE 114 that may need to retrieve services from its home 3GPP network (not shown) and/or the service provider network 140. As shown above, the IP edge node 130 is actually unable to classify the traffic of the UE 114 based on the public IPv4 address it is sharing with the other devices (112, 116) connected to the RG 110.

Other exemplary traffic treatment services (or dynamic policy control and services) where a specific device and/or subscriber needs to be identified at the IP edge node 130 include:
  traffic filtering;
  lawful intercept;
  E-911 services;
  providing billing and accounting;
  intelligent policy-based routing;
  tunneling UE's 114 traffic back to the Home 3GPP network; etc.

Figure 2:
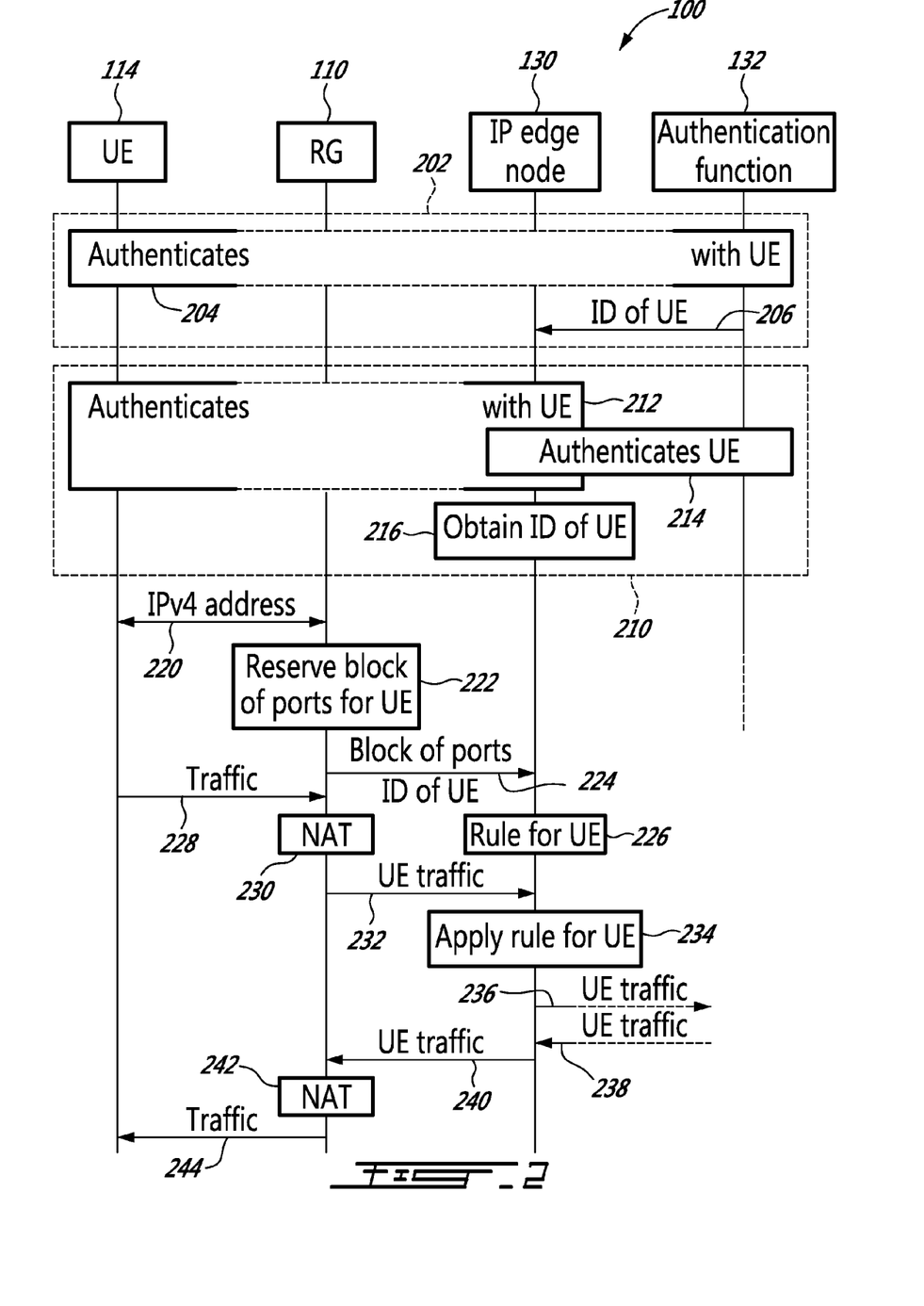
FIG. 2 is an exemplary flow and nodal operation chart for allowing identification of a first exemplary private device in a public network in accordance with the teachings of the invention.

Reference is now made to FIG. 2, which shows an exemplary flow chart of a system for allowing identification of a private device (e.g., 112-116) in a public network (e.g., 140, 150) in accordance with the teachings of the invention. The nodes 110, 114, 130 and 132 shown on FIG. 2 are also shown on the example of FIG. 1.

In the example of FIG. 2, the UE 114 may first need to authenticate itself with the authentication function 132. Two of the many different possibilities to achieve authentication are shown on FIG. 2 (202, 210). The first option 202 achieves authentication by having the UE 114 establish communication (204) with the authentication function 132. Different authentication protocols or plain message exchange could be used during communication 204. An example is a Remote Authentication Dial-In User Service (RADIUS) protocol session. There could be numerous different messages in the communication 204. For the purpose of the present example, it is sufficient to consider the UE 114 authenticated with the authentication function 132. Once this is achieved, the authentication function 132 may send 206 an authentication identifier of the UE 114 to the IP edge node 130. It is to be noted that, in this first option 202, the communication 204 may or not involve the IP edge node 130 without affecting the result of the authentication. If the communication 204 involves the IP edge node 130, it may not be needed to send 206 the authentication identifier of the UE 114 to the IP edge node 130 as it may have intercepted it.

In the second option 210, the IP edge node 130 can serve as a proxy authentication function (e.g., proxy RADIUS). The UE 114 thus establishes a communication (212) with IP edge node 130 using, for instance, a RADIUS protocol session. The IP edge node 130, in turn, communicates 214 with the authentication function 132 using, for instance, the same authentication protocol (i.e., RADIUS). Since it is directly involved in the authentication 210, the IP edge node 130 likely obtains the authentication identifier of the UE 114 (216) without need to send it from the authentication function 132. However, no matter if it obtains the authentication identifier of the UE 114, the authentication function 132 may also send (not shown) the authentication identifier of the UE 114 to the IP edge node 130. For instance, the IP edge 130 could optionally be configured to intercept authentication identifiers as much as possible and the authentication function 132 could optionally be configured to always send authentication identifiers to the IP edge node 130.

If authentication of the UE 114 (202 or 210) was necessary, the RG 110 will likely be able to see that the UE 114 has been successfully authenticated. The RG 110 may also be able to intercept (not shown) the authentication identifier of the UE 114. It should be noted that the term authentication identifier could actually represent any identifier that enables the authentication function 132 to uniquely identify the UE 114. When authentication is not necessary or if nodes are configured differently, any other identifier could also be used.

The example of FIG. 2 then follows with the UE 114 obtaining a private IPv4 address 220 valid in the private network 118, but not valid in public networks (e.g., 120, 140, 150). For instance, in order to obtain its private IPv4 address, the UE 114 may send a DHCP_Discover (not shown) to the RG 110, which would in turn send a DHCP_Offer (not shown) to the UE 114, offering a private IPv4 address thereto. The UE 114 would then respond by sending a DHCP_Request (not shown) to the RG 110 in order to accept the offered private IPv4 address. The RG 110 would then acknowledge the assigned private IPv4 address by sending a DHCP_Ack (not shown) to the UE 114 thereby completing private IPv4 address assignment to the UE 114. The UE 114 may also be configured to use a statically configured private IPv4 address with the RG 110. Even with a statically configured private IPv4 address, the RG 110 still need to allocate the private IPv4 address to the UE 114, at least in terms of address management, in order to be able to route traffic thereto.

Following IPv4 address allocation 220, the RG 110 reserves a block of ports 222 for the UE 114 based on the private IPv4 address allocated thereto. This can be done, for instance, specifically for 3GPP devices or all private IPv4 hosts connected to the RG 110. Following the reservation 222, the RG 110 sends 224 an identification of the block of ports reserved for the UE 114 and may also send the authentication identifier of the UE 114 to the IP edge node 130. The RG 110 implicitly sends its public IPv4 address as the source address when sending the identification of the block of ports. Yet, the public IPv4 address could also be explicitly included in the same message. The identification of the block of ports reserved for the UE 114 likely consists of a numerical range or a list of numerical values. It could also be decided to group ports in a pre-determined manner and provide a group identifier as the identification of the block of ports. Numerical values for port, used in the context of IP, range from are 0 to 65535, with many ranges and specific values being reserved. The manner in which the number of reserved ports is determined and the actual numerical value do not affect the present invention.

The IP edge node 130 receives the identification of the block of ports reserved for the UE 114 and may receive the authentication identifier of the UE 114 from the RG 110. The IP edge node 130, either implicitly or explicitly, also obtains the public IPv4 address of the RG 110. The IP edge node 130 may have already obtained the authentication identifier of the UE 114 during the authentication procedure 202 or 210. In such an example, the IP edge node 130 is able to correlate the two identical authentication identifiers of the UE 114 and properly associate the UE 114 with the block of ports of the public IPv4 address. If the authentication identifier of the UE 114 is not provided, the IP edge node 130 could be configured to request the authentication identifier (if it exists) or another identifier. The request could be addressed to the RG 110 or directly to the UE 114 (e.g., using one or more of the block of ports reserved for the UE 114). Once the block of ports on the public IPv4 address is associated to the UE 114, the IP edge node 130 is able to activate 226 (create or otherwise install) appropriate rule(s) to treat the traffic of the UE 114. The rule or rules related to the UE 114 could be generated in the IP edge node 130 or could be received from the authentication function 132 (e.g., as part of the authentication procedure 202 or 210) or another node (not shown) in the network 100 (e.g., HSS or other administrative node in the network 140 or the UE's 114 home network (not shown)).

Following the private IPv4 address allocation to the UE 114, the UE 114, at some point, may start to send traffic 228 towards a public network (e.g., 140 or 150), which traffic is intercepted at the RG 110. The RG 110 applies NAT 230 to such traffic 228. For instance, NAT 230 can be provided in the RG 110 by swapping the private IPv4 address and port received from the UE 114 with the RG's 110 public IPv4 address and together with a port from the block of ports reserved for the UE 114. The RG 110 than forwards the UE traffic 232 towards its destination, thereby reaching the IP edge node 130.

The IP edge node 130 receives the UE traffic 232 and is able to identify the received traffic as traffic of the UE 114 by comparing the port information in the traffic with the identification of block of ports reserved for the UE 114. The IP edge node 130 is the able to apply the rule(s) 234 to the UE traffic 232 of the UE 114. If applicable (e.g., if addressed to another node than the IP edge node 130 and if traffic treatment allows it), the IP edge node 130 can then forward the UE traffic 236 in the public network (e.g., 140 or 150).

Any reply (e.g., UE traffic 238) related to the UE traffic 236 would be received at the IP edge node 130. The IP edge node 130 could then apply the same or different rule (not shown) or may not apply any rule to the UE traffic 238 before forwarding the UE traffic 240 to the RG 110. The RG 110 then applies NAT 242 to the UE traffic 238 and forwards the traffic 244 to the UE 114 using the private IPv4 address thereof.

The identification of the block of ports reserved for the UE 114 on the public IPv4 address of the RG 110 could also further be registered with one public registry together with a public identifier of the UE 114 (e.g., in a DNS or a SIP registry) (250). The registration could be performed by the UE 114, if it is aware of the RG's 110 public IPv4 address and of the block or ports reserved thereto. The registration could also be performed by the RG 110 on request from the UE 114 or as a normal procedure. In this scenario, a correspondent node (not shown) would be able to obtain the identification of the block of ports reserved for the UE 114 from the registry using the public identifier of the UE 114 and send UE traffic 252 for the UE 114 spontaneously (and not necessarily as a reply as shown for the UE traffic 236). The correspondent node would address the UE traffic 252 to the public IPv4 address on at least one port from the block of ports reserved for the UE 114.

Following reception of the UE traffic 252, the IP edge node 130 could then apply the same or different rule (254) (e.g., considering or not that it is a spontaneous communication and not a reply) to the UE traffic 252 before forwarding the UE traffic 256 to the RG 110. The RG 110 then applies NAT 258 to the UE traffic 256 and forwards the traffic 260 to the UE 114 using the private IPv4 address thereof. The RG 110 could use other information in the traffic 256 (e.g., other header fields or from the payload) to determine to which port(s) of the private IPv4 address the traffic 260 should be sent. Alternatively, there could also exist a mapping from the block of ports reserved for the UE 114 and the port to be used on its private IPv4 address. Yet another alternative is to use one predetermined port (or port range) for all incoming traffic 260.

Of course, the example of FIG. 2 using the UE 114 as a private device is an illustrative example and should not be construed as the sole possibility. For greater certainty, an example is given in FIG. 3 using the Personal Computer (PC) 112 as a private device.

Figure 3:
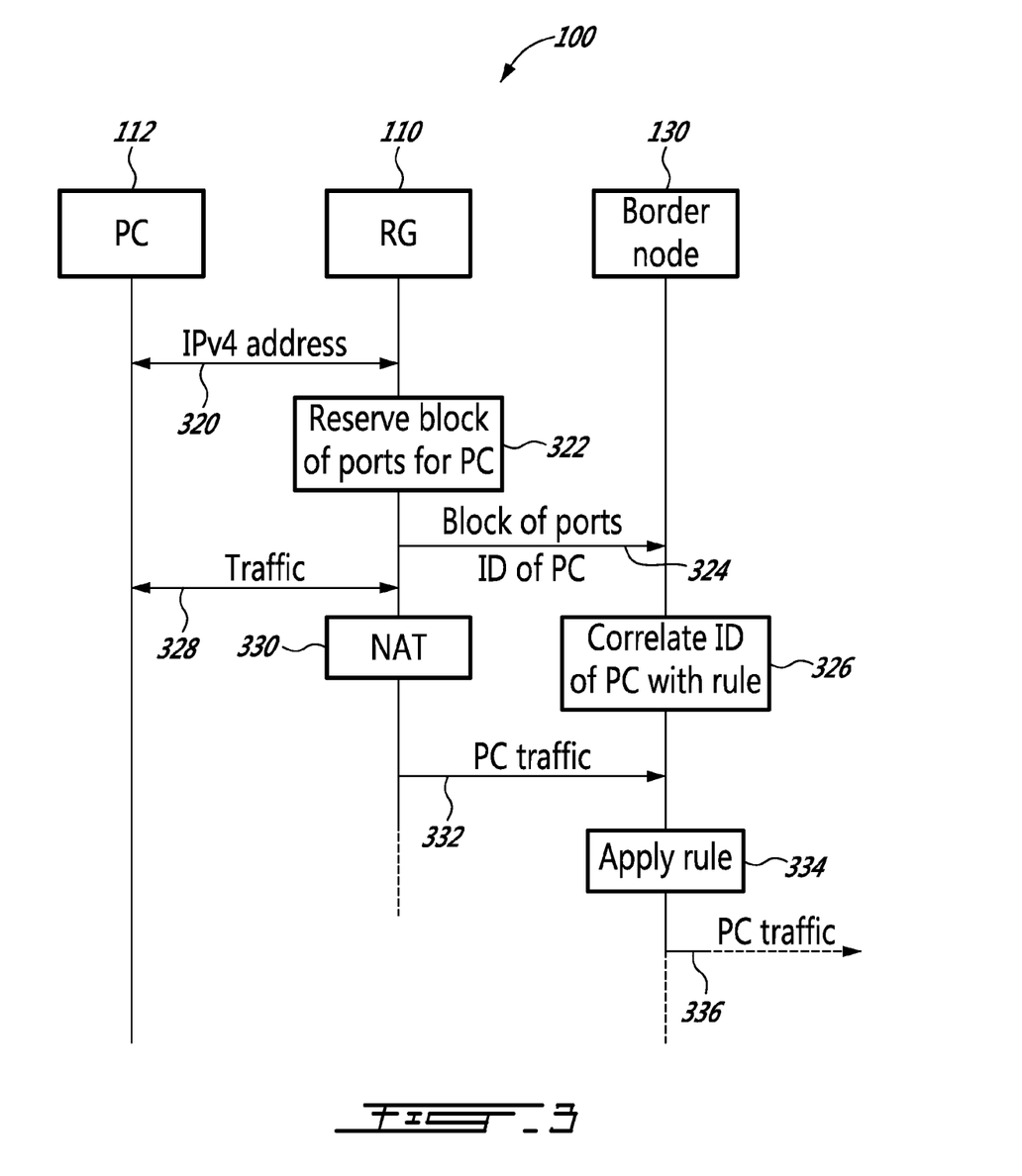
FIG. 3 is an exemplary flow and nodal operation chart for allowing identification of a second exemplary private device in a public network in accordance with the teachings of the invention.

The example of FIG. 3 starts with the PC 112 obtaining a private IPv4 address 320 valid in the private network 118, but not valid in public networks (e.g., 120, 140, and 150). For instance, in order to obtain its private IPv4 address, the PC 112 may send a DHCP_Discover (not shown) to the RG 110, which would in turn send a DHCP_Offer (not shown) to the PC 112, offering a private IPv4 address thereto. The PC 112 would then respond by sending a DHCP_ReqPCst (not shown) to the RG 110 in order to accept the offered private IPv4 address. The RG 110 would then acknowledge the assigned private IPv4 address by sending a DHCP_Ack (not shown) to the PC 112 thereby completing private IPv4 address assignment to the PC 112. The PC 112 may also be configured to use a statically configured private IPv4 address with the RG 110. Even with a statically configured private IPv4 address, the RG 110 still need to allocate the private IPv4 address to the PC 112, at least in terms of address management, in order to be able to route traffic thereto.

Following IPv4 address allocation 320, the RG 110 reserves a block of ports 322 for the PC 112 based on the private IPv4 address allocated thereto. Following the reservation 322, the RG 110 sends 324 an identification of the block of ports reserved for the PC 112 and may also send an identifier of the PC 112 to the IP edge node 130. The RG 110 implicitly sends its public IPv4 address as the source address when sending the identification of the block of ports. Yet, the public IPv4 address could also be explicitly included in the same message. The identification of the block of ports reserved for the PC 112 likely consists of a numerical range or a list of numerical values. It could also be decided to group ports in a pre-determined manner and provide a group identifier as the identification of the block of ports. Numerical values for port, used in the context of IP, range from are 0 to 65535, with many ranges and specific values being reserved. The manner in which the number of reserved ports is determined and the actual numerical value do not affect the present invention.

The IP edge node 130 receives the identification of the block of ports reserved for the PC 112 and may receive the identifier of the PC 112 from the RG 110. If the identifier of the PC 112 is not provided, the IP edge node 130 could be configured to request the identifier to the RG 110 or directly to the PC 112 (e.g., using one or more of the block of ports reserved for the PC 112). The IP edge node 130, either implicitly or explicitly, also obtains the public IPv4 address of the RG 110. The rule or rules related to the PC 112 could be generated in the IP edge node 130 (e.g., generic rue for best effort traffic) or could be received from another node (not shown) in the network 100. The IP edge node 130 is able to correlate the two identical identifiers of the PC 112 and properly associate the PC 112 with the block of ports of the public IPv4 address. Once the block of ports on the public IPv4 address is associated to the PC 112, the IP edge node 130 is able to activate 326 (create or otherwise install) appropriate rule(s) to treat the traffic of the PC 112.

Following the private IPv4 address allocation to the PC 112, the PC 112, at some point, may start to send traffic 328 towards a public network (e.g., 140 or 150), which traffic is intercepted at the RG 110. The RG 110 applies NAT 330 to such traffic 328. For instance, NAT 330 can be provided in the RG 110 by swapping the private IPv4 address and port received from the PC 112 with the RG's 110 public IPv4 address and together with a port from the block of ports reserved for the PC 112. The RG 110 than forwards the PC traffic 332 towards its destination, thereby reaching the IP edge node 130.

The IP edge node 130 receives the PC traffic 332 and is able to identify the received traffic as traffic of the PC 112 by comparing the port information in the traffic with the identification of block of ports reserved for the PC 112. The IP edge node 130 is the able to apply the rule(s) 334 to the PC traffic 332 of the PC 112. If applicable (e.g., if addressed to another node than the IP edge node 130 and if traffic treatment allows it), the IP edge node 130 can then forward the PC traffic 336 in the public network (e.g., 140 or 150).

Figure 4:
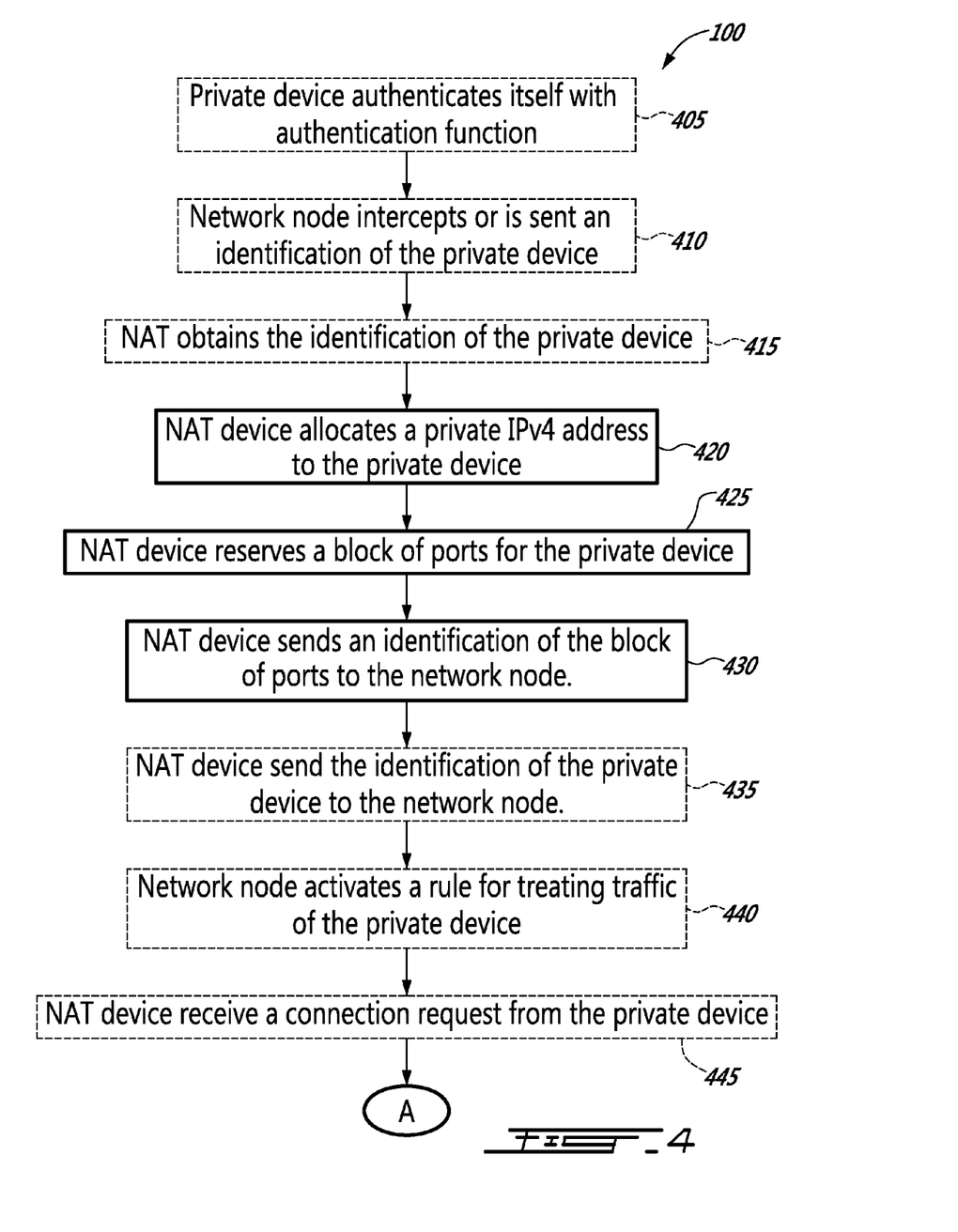
FIG. 4 is an exemplary flow chart for allowing identification of a private device in a public network in accordance with the teachings of the present invention.

FIG. 4 shows an exemplary flow chart for allowing identification of a private device in a public network in accordance with the teachings of the present invention. The private device is located behind a network address translation device having a public IPv4 address valid in the public network in a public network. The private device may in some instances have to authenticate itself with an authentication function 405. A network node of the public network may intercept an identification of the private device during authentication thereof with an authentication function 410. Alternatively, the network node of the public network may receive the identification of the private from the authentication function following authentication of the private device therewith. The network address translation device may also see a successful authentication and obtain the identification of the private device 415.

The network address translation device then allocates a private IPv4 address to the private device 420. It shall be understood that the private device is not in the public network. Of course persons skilled in the art will readily recognize that the private device could have more than one address and that the private device is not in the public network with its private address. The private IPv4 address of the private device cannot be used on the public network. The network address translation device then reserves a block of ports on the public IPv4 address for the private device 425 and sends an identification of the block of ports to the network node in the public network 430. Optionally, the network address translation device may also send the identification of the private device previously obtained to the network node in the public network 435.

The network node of the public network receives the identification of a block of ports on the public IPv4 address indicating that the block of ports is reserved for the private device 430. The network node could optionally receive the identification of the private device from the network address translation device 435. The network node of the public network thereafter activates a rule for treating traffic of the private device 440. Activating the rule could optionally comprise receiving the rule from another network node of the public network before activating the rule upon reception of the identification of the block of ports or creating and activating the rule upon reception of the identification of the block of ports.

The network address translation device can receive a connection request towards the public network from the private device 445 and forward the connection request on the public network using at least one port from the block of ports reserved for the private device 450. The network node of the public network would then receive the traffic addressed from the public IPv4 address on at least one port from the block of ports reserved for the private device 455. The network node of the public network would then identify the received traffic as traffic of the private device 460 e.g., based on the port range being used in the source address of the traffic packets. The network node of the public network may then apply the rule to the traffic of the private device 465 and forward the traffic in the public network 470.

The public network can be, for instance, an IPv6 network and the public IPv4 address, in such an exemplary scenario, could be represented in IPv6 address to ensure backward compatibility. The block of ports is likely to be a contiguous group of at least two ports, but could also be a non-contiguous group of at least two ports without affecting the present invention.

The identification of the block of ports on the public IPv4 address could also further be registered with one public registry together with a public identifier of the private device. In this scenario, a correspondent node is able to obtain the identification of the block of ports reserved for the private device from the public registry using the public identifier of the private device and send incoming traffic to the public IPv4 address on at least one port from the block of ports reserved for the private device.

The network node of the public network can receive the incoming traffic addressed to the public IPv4 address on the at least one port from the block of ports reserved for the private device, identify the incoming traffic as incoming traffic of the private device, apply the rule to the incoming traffic of the private device and forward the incoming traffic towards the network address translation device. The network address translation device can receive the incoming traffic from the public network for the private device on the at least one port from the block of ports reserved for the private device and forwards the incoming traffic to the private device.

Figure 5:
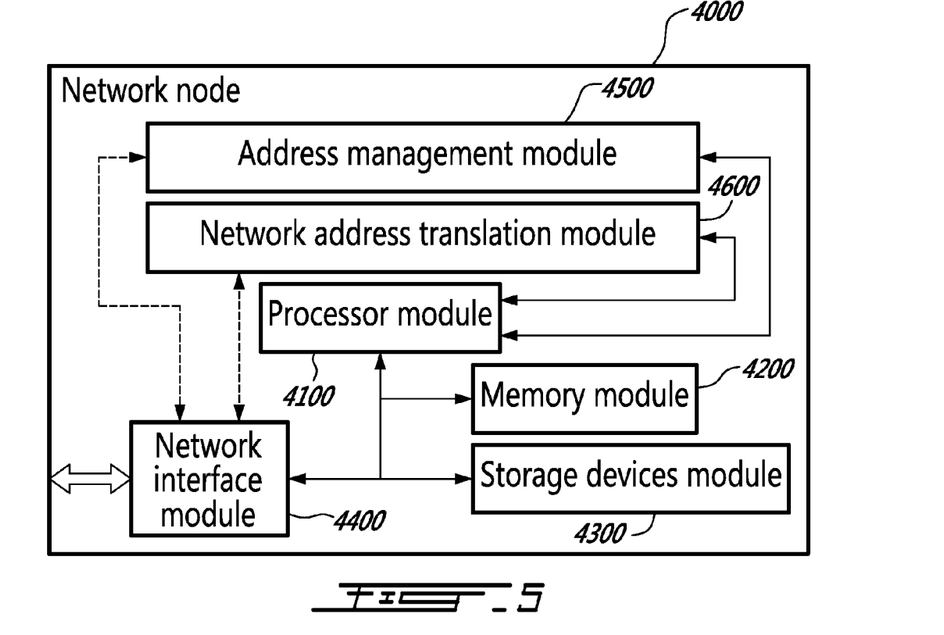
FIG. 5 is an exemplary modular representation of a first network node for allowing identification of an exemplary private device in a public network in accordance with the teachings of the present invention.

FIG. 5 shows an exemplary modular representation of a network node 4000 for allowing identification of a second exemplary private device in a public network in accordance with the teachings of the present invention. The network node 4000 comprises a processor module 4100, a memory module 4200, and a network interface module 4400 and comprises or, otherwise makes available to its other modules, a storage devices module 4300. The network node 4000 also comprises an address management module 4500 and a network address translation module 4600. The address management module 4500 and the network address translation module 4600 may be physical, hardware, modules, but may also represent logical modules implemented by one or more other modules 4100-4400. The address management module 4500 is assigned a public IPv4 address valid in a public network and also allocates a private IPv4 address to a private device not in the public network. The network address translation module 4600 reserves a block of ports on the public IPv4 address for the private device and sends an identification of the block of ports to a further network node in the public network.

The processor module 4100 may represent a single processor with one or more processor cores or an array of processors, each comprising one or more processor cores. The memory module 4200 may comprise various types of memory (different standardized or kinds of Random Access Memory (RAM) modules, memory cards, Read-Only Memory (ROM) modules, programmable ROM, etc.). The storage devices module 4300 may represent one or more logical or physical as well as local or remote hard disk drive (HDD) (or an array thereof). The storage devices module 4300 may further represent a local or remote database made accessible to the network node 4000 by a standardized or proprietary interface. The network interface module 4400 represents at least one physical interface that can be used to communicate with other network nodes. The network interface module 440 may be made visible to the other modules of the network node 4000 through one or more logical interfaces. The actual stacks of protocols used by the physical network interface(s) and/or logical network interface(s) of the network interface module 4400 do not affect the teachings of the present invention. The variants of processor module 4100, memory module 4200, network interface module 4400 and storage devices module 4300 usable in the context of the present invention will be readily apparent to persons skilled in the art. Likewise, even though explicit mentions of the memory module 4200 and/or the processor module 4100 are not made throughout the description of the present examples, persons skilled in the art will readily recognize that such modules are used in conjunction with other modules of the network node 4000 to perform routine as well as innovative steps related to the present invention.

Figure 6:
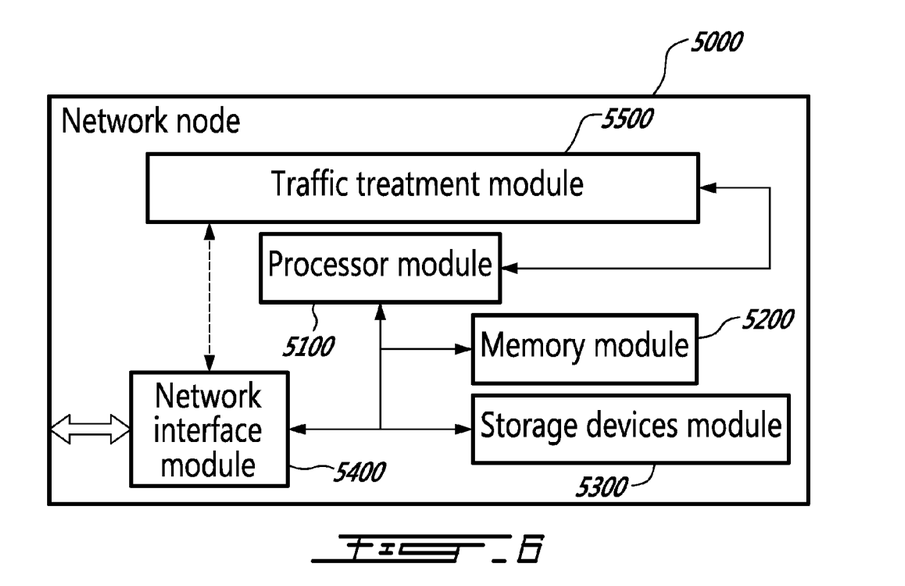
FIG. 6 is an exemplary modular representation of a second network node for allowing identification of an exemplary private device in a public network in accordance with the teachings of the present invention.

FIG. 6 shows an exemplary modular representation of a network node 5000 for allowing identification of a second exemplary private device in a public network in accordance with the teachings of the present invention. The network node 5000 comprises a processor module 5100, a memory module 5200, and a network interface module 5400 and comprises or, otherwise makes available to its other modules, a storage devices module 5300. The network node 5000 also comprises a traffic treatment module 5500 that receives an identification of a block of ports on the public IPv4 address indicating that the block of ports is reserved for the private device, wherein the private device is not in the public network and activates a rule for treating traffic of the private device. The traffic treatment module 5500 may be a physical, hardware, module, but may also represent a logical module implemented by one or more other modules 5100-5400.

The processor module 5100 may represent a single processor with one or more processor cores or an array of processors, each comprising one or more processor cores. The memory module 5200 may comprise various types of memory (different standardized or kinds of Random Access Memory (RAM) modules, memory cards, Read-Only Memory (ROM) modules, programmable ROM, etc.). The storage devices module 5300 may represent one or more logical or physical as well as local or remote hard disk drive (HDD) (or an array thereof). The storage devices module 5300 may further represent a local or remote database made accessible to the network node 5000 by a standardized or proprietary interface. The network interface module 5400 represents at least one physical interface that can be used to communicate with other network nodes. The network interface module 540 may be made visible to the other modules of the network node 5000 through one or more logical interfaces. The actual stacks of protocols used by the physical network interface(s) and/or logical network interface(s) of the network interface module 5400 do not affect the teachings of the present invention. The variants of processor module 5100, memory module 5200, network interface module 5400 and storage devices module 5300 usable in the context of the present invention will be readily apparent to persons skilled in the art. Likewise, even though explicit mentions of the memory module 5200 and/or the processor module 5100 are not made throughout the description of the present examples, persons skilled in the art will readily recognize that such modules are used in conjunction with other modules of the network node 5000 to perform routine as well as innovative steps related to the present invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Although several preferred embodiments of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. For example, even though the Figures present single nodes handling the various algorithm, a cluster of nodes could further performed the task transparently and this is, thus, not to be construed as a pre-requisite of the present invention. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale. Furthermore, the order in which the various steps are performed is necessarily important to the results of the various algorithms. Also, the preceding detailed description does not limit the invention. Instead, the scope of the invention is defined by the appended claims.

What is claimed is:

1. A method for allowing identification of a private device in a public network, the method comprising the steps of:
   in a network address translation device having a public IPv4 address valid in the public network, allocating a private IPv4 address to the private device, wherein the private device is not in the public network;
   in the network address translation device, reserving a block of ports on the public IPv4 address for the private device; and
   in the network address translation device, sending an identification of the block of ports to a network node in the public network.

2. The method of claim 1, further comprising the steps of:
   in the network address translation device, receiving a connection request towards the public network from the private device; and
   in the network address translation device, forwarding the connection request on the public network using at least one port from the block of ports reserved for the private device.

3. The method of claim 1, wherein the step of sending the identification of the block of ports further comprises sending an identification of the private device to the network node in the public network.

4. The method of claim 1, wherein the public network is an IPv6 network and the public IPv4 address is represented in IPv6 address to ensure backward compatibility.

5. The method of claim 1, wherein the block of ports is a non-contiguous group of at least two ports.

6. The method of claim 1, further comprising:
   activating by the network node of the public network a rule for treating traffic of the private device, upon receiving the identification of the block of ports on the public IPv4 address indicating that the block of ports is reserved for the private device.

7. The method of claim 6, wherein the step of activating the rule for treating traffic of the private device further comprises:
   in the network node of the public network, receiving traffic addressed from the public IPv4 address on at least one port from the block of ports reserved for the private device;
   in the network node of the public network, identifying the received traffic as traffic of the private device;
   in the network node of the public network, applying the rule to the traffic of the private device; and
   in the network node of the public network, forwarding the traffic in the public network towards its destination.

8. The method of claim 6, wherein the step of activating a rule for treating traffic of the private device further comprises:
   receiving the rule from another network node of the public network before activating the rule upon reception of the identification of the block of ports; or
   creating and activating the rule upon reception of the identification of the block of ports.

9. The method of claim 6, wherein receiving the identification of the block of ports on the public IPv4 address further comprises receiving an identification of the private device from the network address translation device, the method further comprising the steps of:
   before activating the rule, intercepting in the network node of the public network the identification of the private device during authentication thereof with an authentication function; or
   before activating the rule, receiving in the network node of the public network the identification of the private device from the authentication function following authentication of the private device therewith.

10. A network node in a communications network comprising:
    an address management module that:
      is assigned a public IPv4 address valid in a public network; and
      allocates a private IPv4 address to a private device not in the public network; and
    a network address translation module that:
      reserves a block of ports on the public IPv4 address for the private device; and
      sends an identification of the block of ports to a further network node in the public network.

11. The network node of claim 10, wherein the network address translation module further receives a connection request towards the public network from the private device and forwards the connection request on the public network using at least one port from the block of ports reserved for the private device.

12. The network node of claim 10, wherein the network address translation module sends the identification of the block of ports together with an identification of the private device to the further network node in the public network.

13. The network node of claim 10, wherein the further network node in the public network comprises:

a traffic treatment module that:
  receives the identification of the block of ports on the public IPv4 address indicating that the block of ports is reserved for the private device, wherein the private device is not in the public network; and
activates a rule for treating traffic of the private device.

14. The network node of claim 13, wherein the traffic treatment module further activates a rule for treating traffic of the private device by:
  receiving traffic addressed from the public IPv4 address on at least one port from the block of ports reserved for the private device;
  identifying the received traffic as traffic of the private device;
  applying the rule to the traffic of the private device; and
  forwarding the traffic in the public network towards its destination.

15. The network node of claim 13, wherein the traffic treatment module further:
  receives the rule from another network node of the public network before activating the rule upon reception of the identification of the block of ports; or
  creates and activating the rule upon reception of the identification of the block of ports.

16. The network node of claim 13, wherein the traffic treatment module further receives an identification of the private device from the network address translation device together with the identification of a block of ports on the public IPv4 address and wherein the traffic treatment module further:
  before activating the rule, intercepts the identification of the private device during authentication thereof with an authentication function; or
  before activating the rule, receives the identification of the private from the authentication function following authentication of the private device therewith.

* * * * *

UNITED STATES PATENT AND TRADEMARK OFFICE
CERTIFICATE OF CORRECTION

| | | |
|---|---|---|
| PATENT NO. | : 8,719,449 B2 | Page 1 of 1 |
| APPLICATION NO. | : 12/955540 | |
| DATED | : May 6, 2014 | |
| INVENTOR(S) | : Krishnan et al. | |

It is certified that error appears in the above-identified patent and that said Letters Patent is hereby corrected as shown below:

In the Drawings

In Fig. 4, Sheet 6 of 7, for Tag "455", in Line 1, delete "reveives" and insert -- receives --, therefor.

In the Specification

In Column 2, Line 1, delete "network. the" and insert -- network. The --, therefor.

In Column 7, Line 12, delete "IP edge 130" and insert -- IP edge node 130 --, therefor.

In Column 9, Line 28, delete "DHCP_ReqPCst" and insert -- DHCP_Request --, therefor.

Signed and Sealed this
Sixteenth Day of September, 2014

Michelle K. Lee
*Deputy Director of the United States Patent and Trademark Office*